United States Patent
Monzon et al.

(10) Patent No.: US 8,052,124 B2
(45) Date of Patent: Nov. 8, 2011

(54) ELEVATOR BRAKE WITH COMPOSITE BRAKE HUB

(75) Inventors: Andres Monzon, Madrid (ES); Jose Miguel Aguado, Madrid (ES); Juan Manual Oronoz, Guipuzcoa (ES); Juan Martin, Madrid (ES); Antonio Sanchez, Madrid (ES); Jose Sevilleja, Madrid (ES)

(73) Assignee: Otis Elevator Company, Farmington, CT (US)

(*) Notice: Subject to any disclaimer, the term of this patent is extended or adjusted under 35 U.S.C. 154(b) by 313 days.

(21) Appl. No.: 12/377,694

(22) PCT Filed: Sep. 14, 2006

(86) PCT No.: PCT/US2006/035963
§ 371 (c)(1),
(2), (4) Date: Feb. 17, 2009

(87) PCT Pub. No.: WO2008/033137
PCT Pub. Date: Mar. 20, 2008

(65) Prior Publication Data
US 2010/0163816 A1 Jul. 1, 2010

(51) Int. Cl.
*B66D 1/14* (2006.01)
(52) U.S. Cl. .................................. 254/356; 254/375
(58) Field of Classification Search .............. 254/375, 254/378, 347, 356
See application file for complete search history.

(56) References Cited

U.S. PATENT DOCUMENTS

| 3,675,900 | A | * | 7/1972 | Barron et al. | 254/270 |
|---|---|---|---|---|---|
| 3,727,887 | A | * | 4/1973 | Lytle | 254/356 |
| 4,046,235 | A | * | 9/1977 | Shutt | 188/134 |
| 4,796,728 | A | | 1/1989 | Kanengieter et al. | |
| 5,631,510 | A | | 5/1997 | Flaig et al. | |
| 6,371,252 | B1 | * | 4/2002 | Kanehisa | 188/26 |
| 7,044,272 | B2 | * | 5/2006 | Takizawa | 188/26 |
| 2005/0230199 | A1 | * | 10/2005 | Takizawa et al. | 188/218 XL |
| 2006/0054422 | A1 | * | 3/2006 | Dimsey et al. | 188/17 |
| 2007/0240945 | A1 | * | 10/2007 | Hirotomi et al. | 188/26 |

FOREIGN PATENT DOCUMENTS

GB 2236623 7/1990

OTHER PUBLICATIONS

Search Report and Written Opinion mailed on Jun. 6, 2007 for PCT/US2006/035963.
Notification of Transmittal of the International Preliminary Report on Patentability mailed on Nov. 11, 2008 for PCT/US2006/035963.

* cited by examiner

*Primary Examiner* — Emmanu M Marcelo
(74) *Attorney, Agent, or Firm* — Carlson, Gaskey & Olds, P.C.

(57) ABSTRACT

An elevator brake (20) rotor for use in an elevator machine (10) includes a non-metallic elevator brake hub (36) and a metal flange (34), both of which have an opening with a splined portion for guiding axial movement of the rotor along a rotable shaft (14). This arrangement reduces metal-to-metal contact between the rotor and shaft and reduces noise.

16 Claims, 4 Drawing Sheets

US 8,052,124 B2

ELEVATOR BRAKE WITH COMPOSITE BRAKE HUB

FIELD OF THE INVENTION

This invention generally relates to elevator systems and, more particularly to elevator machine brakes.

DESCRIPTION OF THE RELATED ART

Elevator machines, such as a gearless machine, typically include a machine shaft rotationally driven by a machine motor. A sheave is supported on the machine shaft and rotates with the machine shaft. Ropes or belts are typically tracked through the sheave such that the machine motor may rotate the sheave in one direction to lower the cab and rotate the sheave in the opposite direction to raise the cab.

Some elevator machines typically include a brake having a brake armature that engages a rotor that rotates with the machine shaft to hold the machine shaft and sheave when the cab is at a selected landing. Typical metal rotors include a splined section that engages a splined section of the machine shaft and a flange section that the brake clamps around to resist rotation of the rotor. The rotor slides along the splined section of the machine shaft as the brake clamps and releases the rotor. Undesirably, the metal-to-metal contact between the splined section of the rotor and the splined section of the machine shaft during sliding of the rotor often produces noise.

There is a need for a quieter elevator machine. This invention addresses that need and provides enhanced capabilities while avoiding the shortcomings and drawbacks of the prior art.

SUMMARY OF THE INVENTION

One example elevator brake apparatus for use in an elevator machine includes a rotor that is moveable along a rotatable shaft. A non-metallic elevator brake hub guides axial movement of the rotor along the shaft.

In one example, the non-metallic elevator brake hub is fixed to a flange portion of a rotor. The non-metallic elevator brake hub includes a splined hub opening that aligns with a splined rotor opening through the flange portion. The splined openings engage a corresponding splined portion of a shaft.

The above examples are not intended to be limiting. The various features and advantages of this invention will become apparent to those skilled in the art from the following detailed description of a currently preferred embodiment. The drawings that accompany the detailed description can be briefly described as follows.

DETAILED DESCRIPTION

Figure 1:
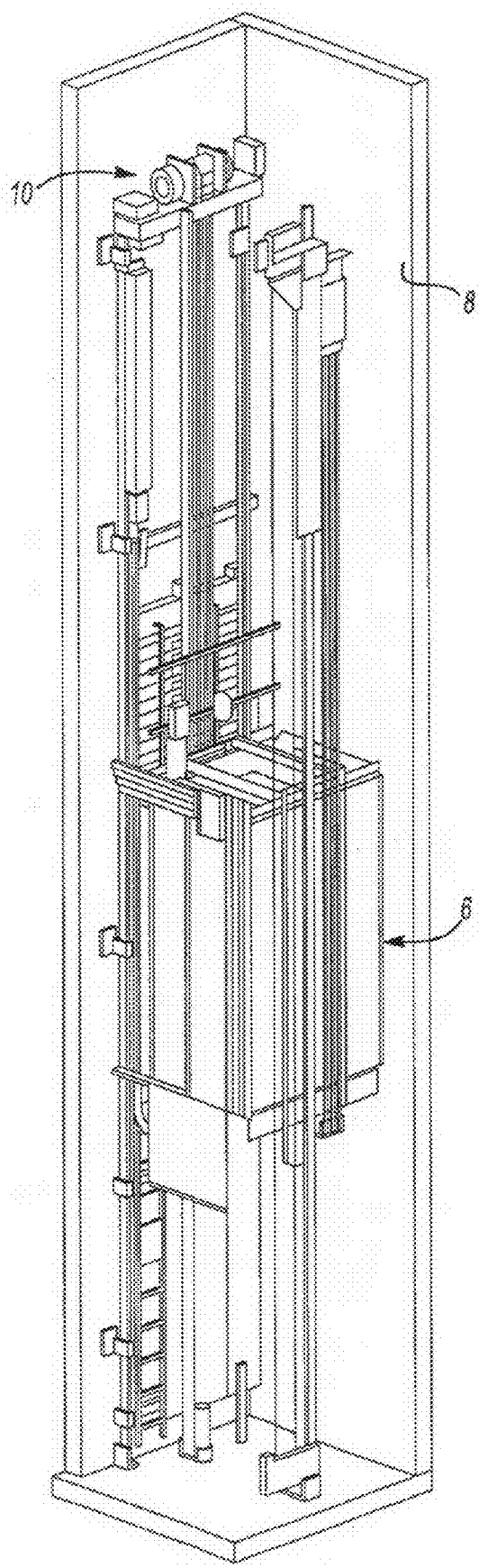
FIG. 1 illustrates selected portions of an example machine roomless elevator system.

FIG. 1 illustrates selected portions of an example elevator car 6 that moves within a hoistway 8 between landings (not shown). The disclosed example illustrates a machine roomless elevator system in which an elevator machine 10 is mounted within the hoistway 8 to move the elevator car 6. One issue of concern with in such an arrangement with prior elevator machines is that noise produced by the elevator machine travels through the hoistway and may be heard by passengers in the elevator car. The elevator machine 10 of the disclosed examples, however, provides quieter operation, as will be described below. It is to be understood that the disclosed examples also contemplate use in other arrangements besides a machine roomless system.

Figure 2:
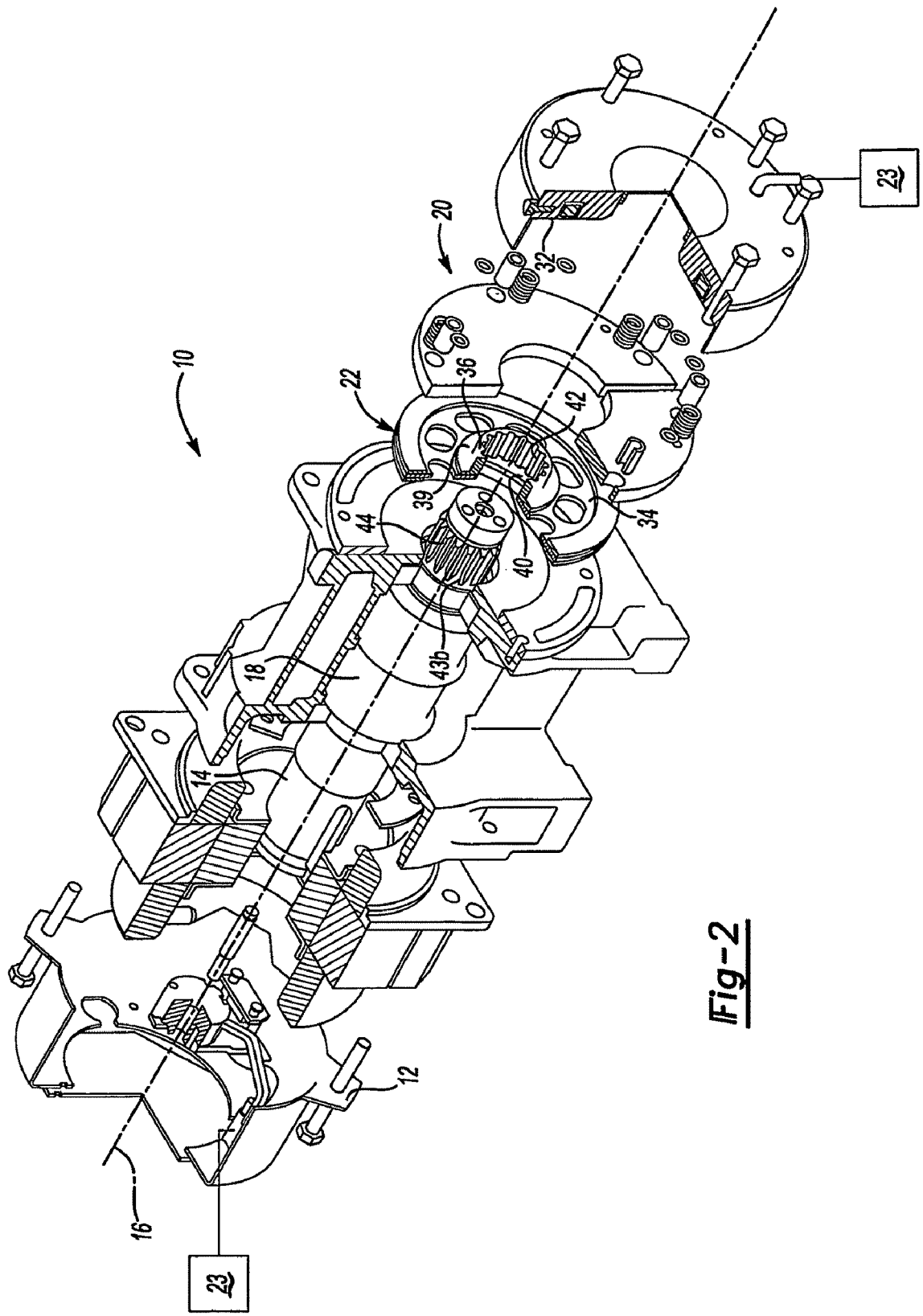
FIG. 2 illustrates selected portions of an example elevator machine having a brake that resists rotation of a motor-driven shaft.

FIG. 2 illustrates an example elevator machine 10, such as a gearless machine. Although a gearless machine is shown in the illustrated example, the disclosed examples are applicable to geared machines as well. In this example, the elevator machine 10 includes a motor 12 that rotationally drives a machine shaft 14 about an axis 16. A sheave 18 rotates with the machine shaft 14. An elevator machine brake 20 includes a rotor 22 that is coupled to the machine shaft 14. The elevator machine brake 20 selectively applies a braking force to the machine shaft 14 to prevent rotation of the machine shaft 14. In a geared machine, the machine shaft drives an output shaft on which a sheave is disposed via gears. For such an arrangement, the brake would be applied to the machine shaft, the output shaft, or an intermediate shaft associated with one of the gears in a known manner. In either arrangement, a controller 23 selectively operates the motor 12 and the elevator machine brake 20 to control movement of the elevator car 6 in the hoistway 8 in a known manner.

Figure 3:
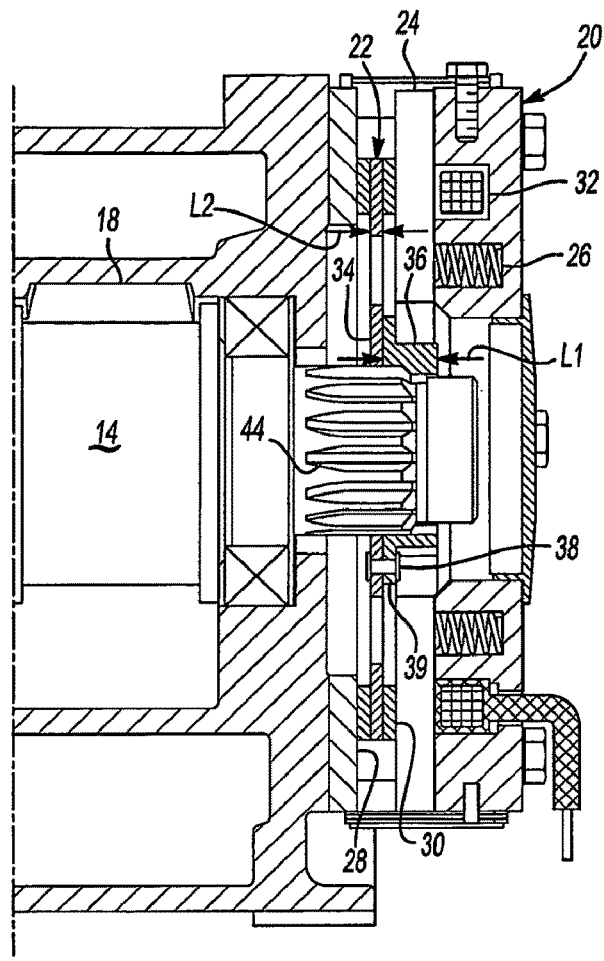
FIG. 3 illustrates selected portions of the brake shown in FIG. 2.

FIG. 3 illustrates selected portions of the elevator machine brake 20. In this example, the elevator machine brake 20 includes an armature 24 for applying a braking force to the rotor 22. Bias members 26 bias the armature 24 in a brake-applying direction toward the rotor 22 to clamp the rotor 22 between the armature 24 and a fixed braking surface 28. In the illustrated example, the rotor 22 includes brake linings 30 for wear resistance. In one example, the brake linings 30 are molded directly on to the rotor 22.

Figure 4:
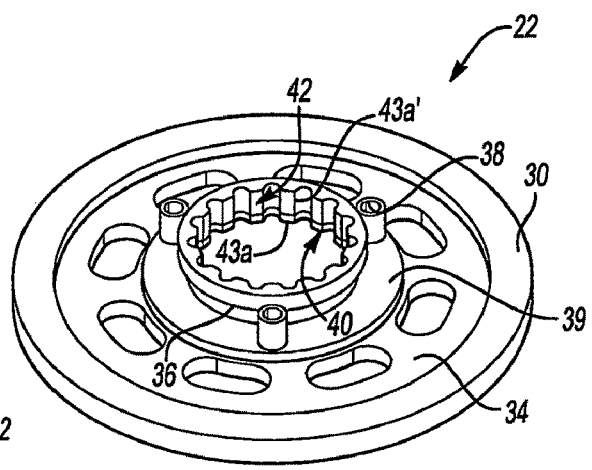
FIG. 4 shows an isolated view of one side of an example rotor having a non-metallic hub.
Figure 5:
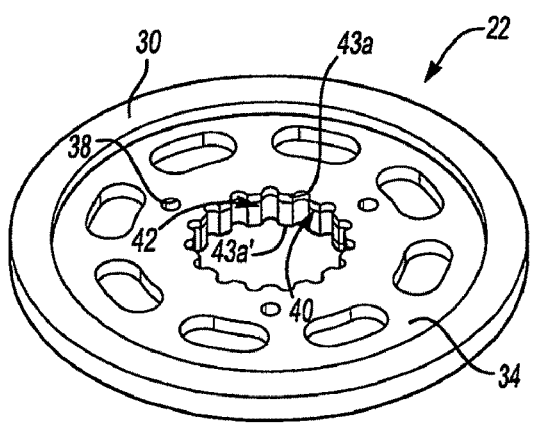
FIG. 5 illustrates the other side of the rotor shown in FIG. 4.

In the illustrated example, the rotor 22 includes a flange portion 34 and a non-metallic hub 36 that is rigidly fixed to the flange portion 34. In the illustrated example, the non-metallic hub 36 is secured to the flange portion 34 using fasteners 38 that extend through an annular flange 39 of the non-metallic hub 36 and the flange portion 34. In one example shown in FIGS. 4 and 5, the fasteners 38 are evenly spaced about the annular flange 39 to uniformly secure the non-metallic hub 36 and flange portion 34 and to maintain rotational balance of the rotor 22.

In another example, the non-metallic hub 36 is over-molded onto the flange portion 34. In another example, the non-metallic hub 36 is bonded with an adhesive to the flange portion 34. Given this description, one of ordinary skill in the art will recognize other arrangements for securing the non-metallic hub 36 to the flange portion 34.

As can be appreciated from FIGS. 2-8, the flange portion 34 includes a splined rotor opening 40 and the non-metallic hub 36 includes a splined hub opening 42 that is axially aligned with the splined rotor opening 40. The splined rotor opening 40 and the splined hub opening 42 are received onto a splined portion 44 of the shaft 14.

The splined rotor opening 40 and the splined hub opening 42 each have respective teeth 43a and 43a' that interlock with corresponding teeth 43b of the splined portion 44 such that the three pieces rotate together. Interlocking between the splines functions to transfer torque between the rotor 22 and the machine shaft 14. In the illustrated example, the teeth 43a, 43a', and 43b are shown with a particular geometric cross-sectional shape. The teeth 43a and 43a' of the splined openings 40 and 42 match in number and geometry to the teeth 43b of the splined portion 44. In the disclosed example, the teeth 43a, 43a', and 43b are designed with a tolerance to accommodate a difference in thermal expansion between the interlocking pieces, such as from thermal expansion differences between metallic and non-metallic materials. Given this description, one of ordinary skill will recognize alternative shapes to meet their particular needs.

Figure 6:
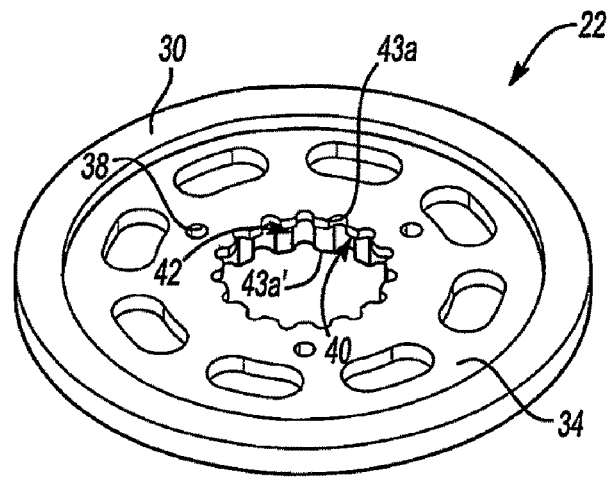
FIG. 6 illustrates an example rotor wherein the splined hub opening is larger than the splined rotor opening.

The splined openings 40 and 42 and teeth 43a and 43a' are formed in a known manner to achieve dimensional equality within a desired tolerance between the openings 40 and 42. In one example, the splined rotor opening 40 and its teeth 43a are formed by stamping, machining, casting, or other known method. The splined hub opening 42 and its teeth 43a' are formed during molding of the non-metallic hub 36. In another example, the openings 40 and 42 and teeth 43a are formed in a single machining operation to obtain improved dimensional equality and alignment between the openings 40 and 42. In another example, the openings 40 and 42 are formed in a known manner to achieve a desired dimensional difference such that the non-metallic hub opening 42 is a desired amount larger in size than the rotor opening 40 and the teeth 43a are axially misaligned with the teeth 43a' (FIG. 6). This provides some play between the teeth 43a' of the non-metallic hub opening 42 and the splined portion 44 of the machine shaft 14.

Figure 7:
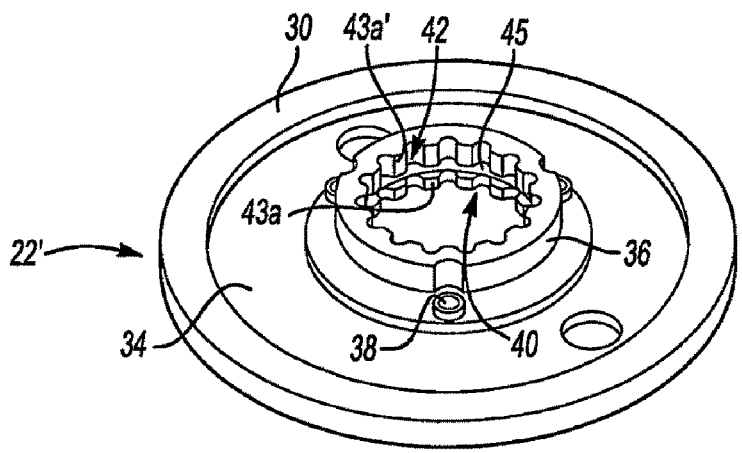
FIG. 7 illustrates an example rotor having a space between the teeth of the splined rotor opening and the teeth of the splined hub opening.

Alternatively, as illustrated in FIG. 7, the rotor 22' includes a space 45 between the teeth 43a and 43a'. In this example, the teeth 43a and 43a' do not extend entirely through the thickness of the rotor 22'.

Figure 8:
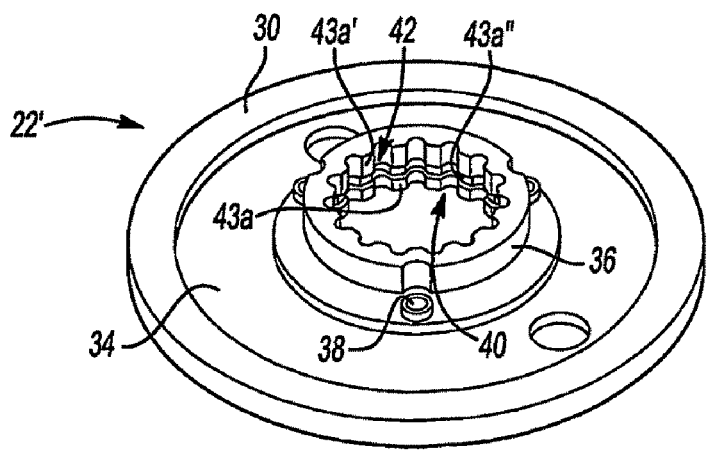
FIG. 8 illustrates an example rotor having a smaller teeth between the teeth of the splined rotor opening and the teeth of the splined hub opening.

In another example, as illustrated in FIG. 8, the rotor 22" includes relatively smaller teeth 43a" between the teeth 43a and 43a' within the space 45. The smaller teeth 43a" serve to reinforce the teeth 43a' of the non-metallic hub 36 during a machining operation to form the teeth 43a and 43a' but do not function to guide movement of the rotor 22". Thus, various rotor configurations are possible for accommodating, for example, friction, thermal expansion, or other variables associated with a particular design.

In the illustrated examples, the flange portion 34 is a circular disk made of a non-magnetic material. In some examples, the non-magnetic material is stainless steel, aluminum, or a reinforced plastic composite. In one example, the thickness of the flange portion 34 is about 4 mm. In another example, the thickness of the flange portion 34 is selected to withstand the entire braking load from the torque that results during braking.

In the disclosed examples, during operation of the brake 20, the rotor 22 (or alternatively rotor 22' or 22" in the examples herefrom) axially moves along the splined portion 44 of the machine shaft 14 as the armature 24 applies and releases braking force. For example, the controller 23 activates an electromagnet 32 to lift the armature 24 and remove the braking force. In this condition, the rotor 22 is spaced apart from the armature 24 and the fixed brake surface 28. Upon deactivating the electromagnet 32, the armature 24 moves the rotor 22 axially toward the fixed brake surface 28. As can be appreciated from this movement, the splined rotor opening 40 and splined hub opening 42 slide along the splined portion 44 of the machine shaft 14.

In the illustrated examples, the non-metallic hub 36 is of sufficient axial length to guide movement of the rotor 22 by maintaining rotor 22 stability and orientation. In the illustrated example, the axial length $L_1$ of the non-metallic hub 36 is greater than the axial length $L_2$ of the flange portion 34 to provide the desired stability and maintain a relative orientation between the rotor 22 and the machine shaft 14. The thickness $L_2$ of the flange portion 34 is selected to withstand the entire braking torque that is applied to the rotor 22. In this example, the thickness $L_1$ of the non-metallic hub 36 is chosen such that the overall rotor 22 thickness provides sufficient guidance. In the disclosed example, the total length of the rotor 22, $L_1$ plus $L_2$, is of similar total length as previously known entirely metallic rotors, although the lengths could be varied to meet the needs of a particular machine design.

In the disclosed example, the non-metallic hub 36 maintains the flange portion 34 in a desired orientation, which in this example is generally perpendicular to the axis 16. The term "perpendicular" is not meant to be limiting in a strict geometrical sense. For example, in the disclosed example there is some play between the rotor 22, non-metallic hub 36 and shaft 14 that permits the flange portion 34 not to be exactly perpendicular. In other words, the non-metallic hub 36 resists out-of-plane rotation of the rotor 22 (i.e., in a direction transverse to a plane of the rotor 22).

In the disclosed example, the flange portion 34 functions to transfer torque load between the rotor 22 and the machine shaft 14, while the non-metallic hub 36 functions to maintain a desired orientation and guide axial movement of the rotor 22. The flange portion 34 is of suitable strength for torque transfer during braking and withstands significant deformation under the torque load. In the disclosed example, the non-metallic material of the non-metallic hub 36 is of suitable strength for axially guiding the rotor 22 and is not meant to transfer a large portion of the torque load. By bearing the torque load, the flange portion 34 reduces or eliminates torque load on the non-metallic hub 36.

In the disclosed example, the non-metallic hub 36 is formed from a plastic material. In another example, the non-metallic hub 36 is formed from a stronger material, such as a composite material. In a further example, the composite material is a reinforced plastic. Using a reinforced plastic provides the non-metallic hub 36 with enough strength to transfer at least a portion of the torque load. Other non-metallic composite materials, not limited to polymers, are also contemplated.

Using the non-metallic hub 36 in combination with the flange portion 34 instead of previously known, entirely metallic rotors, provides several benefits. One drawback of entirely metallic rotors is that the metal-to-metal contact with the shaft produces noise. The non-metallic hub 36, however, reduces the amount of metal-to-metal contact between the rotor 22 and the shaft 14 compared to previously known entirely metallic rotors. This reduces or eliminates the metal-to-metal noise produced as the rotor 22 slides along the shaft 14. In one particular example, the non-metallic hub 36 is made of a noise-dampening material, such as a plastic material, to further reduce the occurrence of noise.

In some examples, the rotor 22 and non-metallic hub 36 also provide the further advantage of being easier to make and less expensive than previously known, entirely metallic rotors. Entirely metallic rotors are typically machined to final shape, which is time consuming and wastes material that is removed during machining. In one example, the flange portion 34 of the rotor 22 is made from a metal plate and requires little or no machining to achieve final shape. The non-metallic hub 36 can be molded in a known manner to final or near final shape. This provides the advantage of eliminating the machining and waste material associated with producing entirely metallic rotors.

The preceding description is exemplary rather than limiting in nature. Variations and modifications to the disclosed embodiment may become apparent to those skilled in the art that do not necessarily depart from the essence of this invention. The scope of legal protection given to this invention can only be determined by studying the following claims.

We claim:

1. An elevator brake rotor for transmitting a braking force to a shaft of an elevator machine, comprising:
   a rotatable shaft having a splined shaft portion including shaft teeth that extend in an axial direction relative to the shaft;
   a rotor flange that is moveable along the rotatable shaft, the rotor flange having a rotor opening that includes a splined rotor portion for engaging the splined shaft portion, the splined rotor portion having rotor teeth that extend in the axial direction; and
   a non-metallic elevator brake hub portion that guides axial movement of the rotor flange along the rotatable shaft, the non-metallic elevator hub including a hub opening having a splined hub portion for engaging the splined shaft portion, the splined hub portion including hub teeth that extend in an axial direction and intermesh with the shaft teeth.

2. The elevator brake rotor as recited in claim 1, wherein the hub opening is about equal in size to the rotor opening such that the rotor teeth are axially aligned with the hub teeth.

3. The elevator brake rotor as recited in claim 1, wherein the hub opening is larger in size than the rotor opening such that the rotor teeth are axially misaligned with the hub teeth.

4. The elevator brake rotor as recited in claim 1, wherein the non-metallic elevator brake hub portion comprises a plastic material.

5. The elevator brake rotor as recited in claim 4, wherein the non-metallic elevator brake hub portion comprises a reinforced plastic material.

6. An elevator brake rotor for transmitting a braking force to a shaft of an elevator machine, comprising:
   a rotor flange having a rotor opening and central axis through the rotor opening, the rotor flange including a splined rotor portion having rotor teeth; and
   a non-metallic elevator brake hub portion including a hub opening having a splined hub portion, the splined hub portion including hub teeth that are axially offset from the rotor teeth, wherein the rotor flange comprises a disk-shaped flange that is secured to the non-metallic elevator brake hub portion.

7. The elevator brake rotor as recited in claim 6, wherein the non-metallic elevator brake hub portion includes an annular hub flange that extends from the splined portion and comprises a plurality of fasteners that secure the non-metallic elevator brake hub portion to the disk-shaped flange.

8. The elevator brake rotor as recited in claim 6, wherein the plurality of fasteners are evenly spaced apart about the annular flange.

9. The elevator brake rotor as recited in claim 6, wherein the non-metallic elevator brake hub portion includes a first axial length and the disk-shaped flange includes a second axial length that is less than the first axial length.

10. The elevator brake rotor as recited in claim 6, wherein the disk-shaped flange comprises a material selected from at least one of a stainless steel, aluminum, or a reinforced plastic.

11. The elevator brake rotor as recited in claim 6, wherein the hub opening is about equal in size to the rotor opening such that the rotor teeth are axially aligned with the hub teeth.

12. The elevator brake rotor as recited in claim 6, wherein the hub opening is larger in size than the rotor opening such that the rotor teeth are axially misaligned with the hub teeth.

13. The elevator brake rotor as recited in claim 6, including an axial space between the rotor teeth and the hub teeth.

14. The elevator brake rotor as recited in claim 13, including smaller teeth, relative to the rotor teeth and the hub teeth, within the axial space.

15. A brake that includes the elevator brake rotor as recited in any of claims 1-5, wherein the brake comprises an axially moveable armature that selectively applies a braking force to the brake rotor.

16. The brake as recited in claim 15, comprising a motor for rotating the shaft, and a sheave that is rotated by the shaft.

\* \* \* \* \*